July 4, 1939.   H. R. TEAR   2,164,553
METHOD OF MAKING LUBRICATING DEVICES
Original Filed Nov. 21, 1932
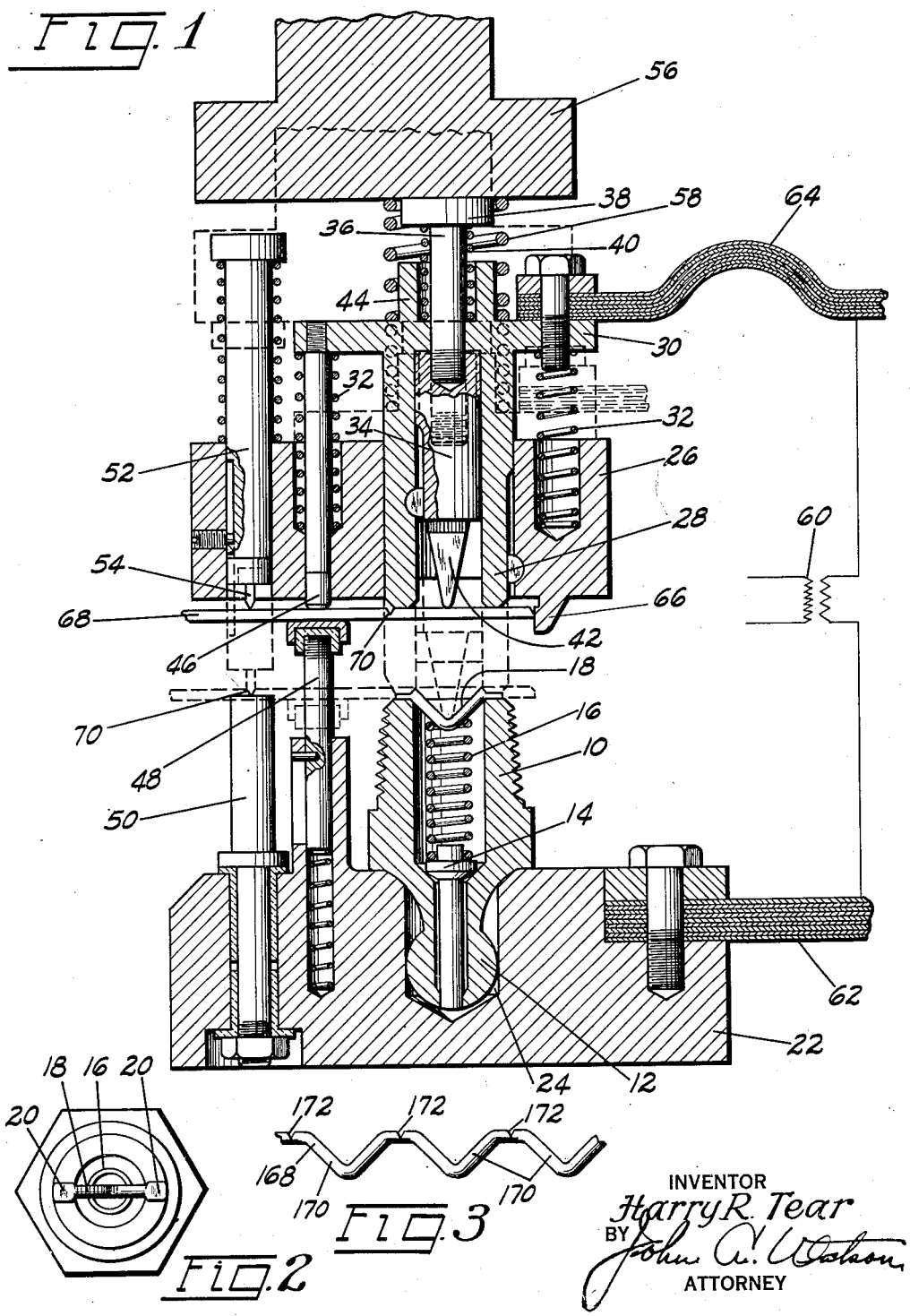
INVENTOR
Harry R. Tear
BY
John A. Watson
ATTORNEY Patented July 4, 1939

2,164,553

UNITED STATES PATENT OFFICE 2,164,553

METHOD OF MAKING LUBRICATING DEVICES

Harry R. Tear, Evanston, Ill., assignor to The Lubrication Corporation, Chicago, Ill., a corporation of Delaware Continuation of application Serial No. 20,447, May 8, 1935, which is a division of application Serial No. 643,688, November 21, 1932, now Patent No. 2,046,418, dated July 7, 1936. This application September 11, 1937, Serial No. 163,399

6 Claims. (Cl. 29—157)

This invention relates to lubricating devices and more particularly to lubricant receiving fittings and method of constructing the same.

This application is a continuation of my copending application Serial No. 20,447 filed May 8, 1935, which is in turn a division of my Patent No. 2,046,418. In said patent there is disclosed and claimed a novel lubricant receiving fitting having a valve incorporated therein which is urged toward its seat by a compression spring. The spring is held in place by a spring retainer fastened to the fitting and it is an object of the present invention to provide a novel method of assembling a fitting and particularly of securing a spring retainer in place.

Another object is to provide a novel method of welding in which two members are simultaneously welded together and one of the members is severed.

According to one desirable arrangement a fitting is provided in which a valve and valve spring are assembled and a wire is welded over the end of the fitting to retain the spring in place, the wire being severed by the welding operation. The wire is preferably formed with a V-bend upon which the end of the spring seats to prevent shifting thereof, the bend being either preformed or formed after the wire is laid over the fitting by pressing a portion of the wire into the fitting bore. If desired, the wire may be cross-scored to facilitate severing during the welding operation.

Other and further objects, advantages and novel features will be apparent from the following detailed description when taken in connection with the accompanying drawing illustrating .e arrangement for practicing the invention and in which:

Fig. 1 is a sectional view of a machine for carrying out the novel method of the invention;

Fig. 2 is an end view of a fitting constructed in accordance with the invention; and Fig. 3 is a view of a series of novel spring retainers.

The method of the present invention is particularly useful in assembling lubricant fittings and securing spring retainers thereto. A completed fitting constructed according to the invention is illustrated on the drawing as constituted by a tubular shank 10 and a bored head 12 and a valve 14 in the shank for closing off the bore. The valve is urged toward its seat by a compression spring 16 in the shank, bearing at one end on the valve and at its other end on a spring retainer 18 secured over the end of the shank. The spring retainer is preferably formed of a piece of relatively thin wire extending across the open end of the shank and welded thereto at its opposite ends as indicated at 20, the intermediate portion of the wire, if desired, being formed with a V-bend extending into the shank and forming a sharp projection on which the end of spring 16 seats to prevent side movement of the spring.

Fig. 1 illustrates a machine for assembling fittings according to my novel method, as constituted by a stationary bed 22 having a bore 24 therein to receive the head of a fitting and to support the fitting in upright position. A stationary head 26 is spaced above the bed 22 and slidably supports a tubular plunger 28 having an upper flange 30. Suitable compression springs 32 act between the head 26 and flange 30 to urge the plunger 28 to its upper position shown in full lines in Fig. 1.

A plunger 34 is slidably mounted in the tubular plunger 28 and has a rod 36 projecting from its upper end. The top of rod 36 carries a flange 38 and a compression spring 40 acts between flange 38 and the top of plunger 28 to urge the plunger 34 to its uppermost position. A forming punch 42 is secured to the lower end of plunger 34 and is electrically insulated therefrom. A sleeve 44 is preferably provided on the upper end of plunger 28 surrounding the rod 36 and of a size to engage the flange 38 when it is depressed.

Suitable clamping means is provided for clamping a wire fed into the machine, such means as shown being formed by a rod 46 secured at its upper end to the flange 30 and slidable through a suitable opening in the head 26. A cooperating rod 48 is slidably mounted in a bore in the bed 22 and is urged upwardly by a suitable spring. The upper end of rod 48 is preferably faced with a suitable bearing material which is electrically insulated from the rod.

Means are preferably provided for scoring the wire, shown as a stationary anvil 50 secured to and electrically insulated from the bed 22 and a plunger 52 slidably mounted in a bore in head 26 and carrying at its lower end a scoring tool 54.

A reciprocating actuator 56 is provided to operate the machine, a compression spring 58 preferably bearing on the actuator and the flange of plunger 28. Welding current is supplied from a source 60 connected through leads 62 and 64 to bed 22 and plunger 28 respectively and controlled by switch mechanism, not shown.

In operating the machine to carry out the novel method a fitting having the valve and valve spring therein is placed in the bore 24 as shown and a suitable wire 68 is fed in, a stop shoulder 66 preferably being provided on the head 26 to limit feeding of the wire to the correct amount. Upon depression of the actuator 56 the plunger 28 will be depressed through spring 58, thus lowering rod 46 and clamping the wire between rods 46 and 48. Further depression of the actuator carries the end of the plunger 28 and the wire into contact with the top of the fitting with the wire between the plunger and the fitting.

Continued depression of the actuator compresses spring 58 moving plunger 34 downwardly in plunger 28 and forcing the wire into the open end of the fitting to form a V-bend. During this time the wire to the left of the fitting is firmly clamped between rods 46 and 48 so that the free end of the wire to the right of the fitting will be drawn in to supply the extra length necessary for the formation of the V-bend. As the actuator moves further, it forces flange 38 against sleeve 44 thereby applying a positive high pressure to the plunger 34 and deforming the wire against the end of the fitting.

At this time a suitable switch mechanism, not shown, which preferably is actuated automatically by operation of the machine, will complete a circuit from source 60 through lead 64, plunger 28, wire 68, fitting 10, bed 22 and lead 62 back to the source. Thus welding current is supplied to weld the wire to the fitting, the switch preferably being operated to open the circuit prior to removal of pressure from the plunger 28 so that the weld will set under pressure. During the welding operation the wire will be melted and severed at its point of contact with the fitting at the left thereof in Fig. 1.

During the last stage of actuator movement described above the scoring tool 54 will press the wire against the anvil 50 to cross score the wire as indicated at 70. This facilitates severing of the wire during welding and insures that it will be severed at the proper place.

The actuator will now be raised permitting the plunger 54 to follow under the action of springs 32 at which time the completed fitting may be removed. Another fitting is then placed in the machine, a new length of wire fed in and the cycle of operations repeated.

Fig. 3 illustrates a series of preferred spring retainers which may be employed according to a modified method. As shown, these retainers are constituted by a continuous length of wire 168 formed at intervals throughout its length with V-bend portions 170 which are separated by cross scores 172. This form of retainers may be applied by welding in a machine similar to that of Fig. 1 but omitting the plunger 34 and scoring tool or welding by hand or other suitable machine. Preferably, however, each retainer is severed from the rest of the wire during the welding operation in the same manner as in the method described above.

While several embodiments of the invention have been shown and described, it will be apparent that changes might be made therein and it is not intended that the scope of the invention shall be limited to the disclosed embodiments or otherwise than by the terms of the appended claims.

What is claimed is:

1. The method of forming and affixing a valve spring retainer for a lubricant receiving fitting which consists in feeding a length of steel wire over the end of the tubular fitting shank, in holding one end of the wire against movement, in depressing the mid-portion of the wire into the bore of the shank and in permanently affixing the wire at its points of contact with the end wall of the shank thereto.

2. The method of forming and affixing a valve spring retainer for a lubricant receiving fitting which consists in feeding a length of steel wire over the end of the tubular fitting shank, in holding one end of the wire against movement, in depressing the mid-portion of the wire into the bore of the shank and in welding the wire at its points of contact with the end wall of the shank thereto.

3. The method of forming and affixing a valve spring retainer for a lubricant receiving fitting which consists in feeding a length of steel wire over the end of the tubular fitting shank, in holding one end of the wire against movement, in depressing the mid-portion of the wire into the bore of the shank, in welding the wire at its points of contact with the end wall of the shank thereto, and in cross scoring the wire at intervals equal to the full length of the retainer prior to feeding the wire over the fitting shank.

4. The method of securing a wire over the end of a tubular member which comprises cross-scoring the wire, extending the wire across one end of the tubular member with the scores adjacent one edge of said member and applying heat to the wire at its points of contact with the tubular member simultaneously to weld the wire to the member and sever the wire at said scores.

5. The method of securing a relatively thin elongated member to a second member of relatively greater mass which comprises cross scoring said first member, placing the portion of said first member adjacent the score in contact with said second member and applying heat simultaneously to weld said members and to sever said first member at the cross score.

6. The method of forming and affixing a valve spring retainer to a bored fitting shank which comprises bending a piece of wire with a V-bend, scoring said wire at opposite sides of said V-bend, laying said wire on the fitting shank with the V-bend extending into the bore thereof and portions of the wire adjacent said scores in contact with the shank and applying heat to the points of contact simultaneously to weld the wire to the shank and to sever the wire at the scores.

HARRY R. TEAR.